(12) United States Patent
Rhoads et al.

(10) Patent No.: US 8,027,508 B2
(45) Date of Patent: Sep. 27, 2011

(54) INTERACTIVE GAMING OBJECTS

(75) Inventors: Geoffrey B. Rhoads, West Linn, OR (US); Burt W. Perry, Lake Oswego, OR (US); Kenneth L. Levy, Stevenson, WA (US); Joel R. Meyer, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 12/534,539

(22) Filed: Aug. 3, 2009

(65) Prior Publication Data

US 2010/0029380 A1    Feb. 4, 2010

Related U.S. Application Data

(63) Continuation of application No. 10/887,242, filed on Jul. 7, 2004, now Pat. No. 7,570,781.

(60) Provisional application No. 60/486,047, filed on Jul. 9, 2003.

(51) Int. Cl.
*H04K 1/00* (2006.01)

(52) U.S. Cl. .......................... 382/100; 463/16

(58) Field of Classification Search .................. 382/100, 382/317; 348/143, 150, 157; 705/14.1, 14.12, 705/14.5; 463/16, 23, 25, 29
See application file for complete search history.

(56) References Cited

U.S. PATENT DOCUMENTS

| | | | | |
|---|---|---|---|---|
| 5,397,133 A * | 3/1995 | Penzias | ........................ | 273/439 |
| 5,651,548 A | 7/1997 | French et al. | ................... | 273/309 |
| 5,735,742 A | 4/1998 | French | ............................ | 463/25 |
| 5,862,260 A | 1/1999 | Rhoads | ........................ | 382/232 |
| 5,941,769 A | 8/1999 | Order | ................................ | 463/12 |
| 6,029,891 A | 2/2000 | Freeman et al. | ............. | 235/380 |
| 6,115,482 A | 9/2000 | Sears et al. | ..................... | 382/114 |
| 6,122,403 A | 9/2000 | Rhoads | ........................ | 382/233 |
| 6,254,484 B1 * | 7/2001 | McCrea, Jr. | ..................... | 463/27 |
| 6,260,757 B1 | 7/2001 | Strisower | ...................... | 235/379 |
| 6,285,776 B1 | 9/2001 | Rhoads | ........................ | 382/100 |
| 6,311,214 B1 | 10/2001 | Rhoads | ........................ | 709/217 |
| 6,345,104 B1 | 2/2002 | Rhoads | ........................ | 382/100 |
| 6,460,848 B1 * | 10/2002 | Soltys et al. | ............. | 273/149 R |
| 6,489,892 B2 | 12/2002 | Lawandy | ................. | 340/572.3 |
| 6,514,140 B1 * | 2/2003 | Storch | ............................. | 463/25 |
| 6,532,297 B1 | 3/2003 | Lindquist | ...................... | 382/100 |
| 6,542,927 B2 | 4/2003 | Rhoads | ........................ | 709/217 |
| 6,573,883 B1 | 6/2003 | Bartlett | ......................... | 345/156 |
| 6,614,914 B1 | 9/2003 | Rhoads et al. | ................ | 382/100 |
| 6,636,615 B1 | 10/2003 | Rhoads et al. | ................ | 382/100 |
| 6,650,761 B1 | 11/2003 | Rodriguez et al. | ............ | 382/100 |
| 6,681,028 B2 | 1/2004 | Rodriguez et al. | ............ | 382/100 |
| 6,735,324 B1 | 5/2004 | McKinley et al. | ............ | 382/100 |
| 6,788,800 B1 | 9/2004 | Carr et al. | ..................... | 382/100 |
| 6,823,075 B2 | 11/2004 | Perry | ............................ | 382/100 |
| 6,848,994 B1 | 2/2005 | Knust et al. | ...................... | 463/25 |
| 6,947,571 B1 | 9/2005 | Rhoads et al. | ................ | 382/100 |
| 6,970,886 B1 | 11/2005 | Conwell et al. | ............... | 707/104 |
| 7,003,731 B1 | 2/2006 | Rhoads et al. | ................ | 715/768 |
| 7,044,395 B1 | 5/2006 | Davis et al. | ..................... | 235/494 |
| 7,051,086 B2 | 5/2006 | Rhoads et al. | ................ | 709/219 |
| 7,174,031 B2 | 2/2007 | Rhoads et al. | ................ | 382/107 |
| 7,206,820 B1 | 4/2007 | Rhoads et al. | ................ | 709/217 |
| 7,222,852 B2 | 5/2007 | Soltys et al. | ............. | 273/148 R |
| 7,227,526 B2 | 6/2007 | Hildreth et al. | ................ | 345/156 |
| 7,261,612 B1 | 8/2007 | Hannigan et al. | ............. | 446/175 |
| 7,406,214 B2 | 7/2008 | Rhoads et al. | ................ | 382/107 |
| 7,502,759 B2 | 3/2009 | Hannigan et al. | ............... | 705/51 |
| 7,536,034 B2 | 5/2009 | Rhoads et al. | ................ | 382/100 |
| 7,570,781 B2 * | 8/2009 | Rhoads et al. | ................ | 382/100 |
| 7,628,320 B2 | 12/2009 | Rhoads | ........................ | 235/375 |
| 7,760,905 B2 | 7/2010 | Rhoads et al. | ................ | 382/100 |
| 7,792,325 B2 | 9/2010 | Rhoads et al. | ................ | 382/100 |
| 2002/0111857 A1 | 8/2002 | Harris et al. | ..................... | 705/14 |
| 2003/0037075 A1 | 2/2003 | Hannigan et al. | ............. | 707/500 |
| 2003/0103644 A1* | 6/2003 | Klayh | ............................ | 382/100 |
| 2004/0128512 A1 | 7/2004 | Sharma et al. | ................ | 713/176 |
| 2004/0251309 A1 | 12/2004 | Cove | ............................. | 235/493 |
| 2005/0013462 A1 | 1/2005 | Rhoads | ........................ | 382/100 |
| 2007/0104348 A1* | 5/2007 | Cohen | ........................... | 382/100 |

FOREIGN PATENT DOCUMENTS

WO    WO-01/84438 A1    11/2001

OTHER PUBLICATIONS

Non-Final Office Action on U.S. Appl. No. 10/887,242, mailed Nov. 26, 2008.
Notice of Allowance on U.S. Appl. No. 10/887,242, mailed Apr. 3, 2009.
Restriction Requirement on U.S. Appl. No. 10/887,242, mailed Nov. 20, 2007.

* cited by examiner

*Primary Examiner* — Andrew W Johns

(57) ABSTRACT

A method for operating an electronic gaming system captures an image of a gaming object, extracts identifying information from the image of the gaming object, and uses the extracted identifying information to reference a database to determine a behavior associated with the identifying information. The method returns data to the gaming system to execute or control the behavior of the gaming system in response to the gaming object. Various system configurations for this method as well as unique applications of it are also disclosed.

22 Claims, 4 Drawing Sheets

INTERACTIVE GAMING OBJECTS

RELATED APPLICATION DATA

This application is a continuation of application Ser. No. 10/887,242, filed Jul. 7, 2004 (now U.S. Pat. No. 7,570,781), which claims benefit to provisional application 60/486,047, filed Jul. 9, 2003.

The above documents are hereby incorporated by reference, as are application Ser. No. 09/574,726, filed May 18, 2000, 60/141,468, filed Jun. 29, 1999, and 60/134,782, filed May 19, 1999; U.S. Pat. Nos. 6,311,214, 6,650,761, 6,681,028, 6,735,324, 6,788,800, 6,823,075, 6,947,571, 7,261,612; and patent publications WO 01/84438, US 2002-0111857, US 2003-0037075, and US 2004-0128512.

TECHNICAL FIELD

The invention relates to machine interaction with physical objects through visible/invisible scanning systems, associating behavior and digital information with physical objects through machine-readable codes on the objects, and digital watermarking.

BACKGROUND AND SUMMARY

The gaming industry has expanded significantly in terms of the technology and variety of games, as well as the venues for the games. The gaming industry uses various forms of physical and electronic tokens, cards, chips, etc. as monetary units and playing objects. In addition, the technology now bridges conventional playing objects like chips, coins and cards in conventional venues to encompass the digital realm including electronic gaming machines, on-line gaming, electronic monetary units, etc.

Just as the technology used in gambling and casinos has diversified and become integrated with digital systems, so has the technology available to pirates. Pirates can cheat in new and various ways, from making counterfeit monetary tokens to faking playing objects like playing cards and dice.

The use of machine readable embedded data in gaming system offers a variety of ways to combat cheating as well as enhance the gaming experience. Steganographic techniques, such as digital watermarking, enable playing objects and monetary tokens to be authenticated and enhanced. Other forms of machine readable codes can be used in conjunction with digital watermarks for these applications as detailed in this document.

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are hereby incorporated by reference.

A related field in content recognition and identification uses image attributes to identify images. These attributes are typically derived from perceptual features and/or hashes of images. Such techniques can be used in conjunction with embedded information to identify and validate objects through comparison with stored attributes for the image.

One aspect of the invention is a method for operating an electronic gaming system. The method includes capturing an image of a gaming object; extracting identifying information from the image of the gaming object; and using the extracted identifying information to reference a database to determine a behavior associated with the identifying information. The method returns data to the gaming system to execute or control the behavior of the gaming system in response to the gaming object.

Various system configurations for this method as well as unique applications of it are also disclosed.

Further features will become apparent with reference to the following detailed description and accompanying drawings.

DETAILED DESCRIPTION

Figure 1:
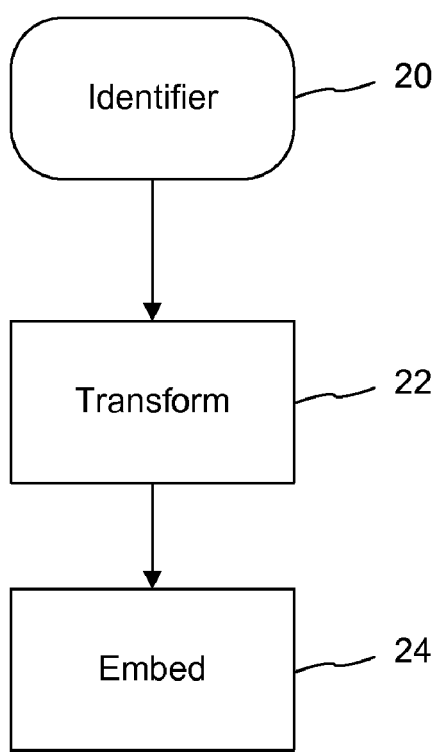
FIG. 1 is a flow diagram illustrating a method for embedding an object identifier into an object.

For the sake of this description, we use the term gaming to broadly encompass legalized gambling, including gaming at physical venues like casinos, in electronic gaming machines, and in on-line gaming systems. The monetary objects used in gaming encompass currency (coins and bills), and monetary tokens such as chips (including plastic chips used in card games and metal tokens used in slot machines), cash cards, and playing tokens. Monetary units can be represented in either monetary objects, or electronic versions thereof. The term "playing object" encompasses objects used in gaming, such as playing cards, dice, as well as game boards and devices.

In this section, we describe a number of ways to use embedded data in gaming applications. While particularly focus on digital watermarking, the data may be embedded using other machine readable codes or combinations of digital watermarks and other codes (like RF ID tags, holograms with machine readable data, smart cards, magnetic ink or stripes, bar codes, glyphs, etc.). Our implementations of digital watermarking offer advantages because it is unobtrusive to other markings on monetary and playing objects used in gaming, it can be covert (e.g., using various forms of scrambling, data hiding and masking by other visible features on the object), it can be imparted through printing or object surface textures processes, and it is adaptable to a variety of functions, including carrying robust data that is readable by conventional visible or invisible light (such as infrared and ultraviolet) scanning, and carrying signals used to distinguish originals from copies of objects.

One application is authentication of the playing and monetary objects used in gaming. Within this application domain, there are a variety of implementation scenarios. In these scenarios, the digital watermark embedded on the object performs one or more of the following functions:
1. its presence means that the object is valid;
2. it carries a variable bit payload that conveys information, such as:
   a. information identifying the gaming venue, such as a casino, such that the playing object is only valid at the venue encoded into the object;
   b. information identifying a monetary value;
   c. an instruction to control a gaming machine or system (for example, instruction enables gaming machine to play a game);
   d. information identifying the playing object, such as the value of the playing card (e.g., ace of spades) for checking that the object is what it purports to be;
   e. information that identifies the person that the object belongs to such that, for example, the object is not playable or valid in a game if used by another person (e.g., the information matches a user's secret password, biometric information, machine readable personal identification document, etc.).

In the context of the variable payload, the information may be entirely conveyed in the embedded data on the object, or the embedded data may provide an index to a local or remote database record that stores related behavior or information associated with the object. Thus, the variable information is usable in on-line reader systems, as well as off-line reader systems.

For example, each object in a casino may have the same embedded identifier that associates that object with the casino. If one company makes chips for several casinos, then different identifiers will be embedded in the objects for each casino such that the objects used in a particular casino are persistently associated with that casino. Unique identifiers may be assigned per customer, per lot, per object, etc. For automated verification, the association between the identifier embedded in object and the controls or restrictions that apply to that object may be programmed into the readers and/or stored in a database that the readers communicate with. To prevent embedded data from being replicated in counterfeit objects, the embedded data can be made dependent upon unique attributes of the object such as unique images or surface textures on the object. In the reader, these unique attributes can either be used to extract the embedded data (unless unique attributes provide the correct key to extract the embedded data, that data is not extractable, and therefore the object is invalid), or can be used to cross check the unique attributes with the embedded data (unless the unique attributes embedded in the data match the unique attributes on the object, the object is not valid).

The nature of the digital watermark may be designed to be robust to survive printing, scanning, etc. Alternatively, it may be designed to degrade in response to copy, reproduction, or re-origination operations, (e.g., an attempt to scan it with a digital scanner and re-print or re-originate that image on a counterfeit object), sometimes referred to as a semi-fragile or fragile watermark (more details below).

The object may contain both a robust watermark to persistently convey information, as well as semi fragile or fragile watermark as a metric used to measure changes in the object (such as changes in the image's color, frequency response, etc.) that occur when it is reproduced, either through copying or re-origination.

Reader systems may be implemented in a variety of places and systems. One is a money exchange, where monetary tokens are dispensed or redeemed. In this case, the reader prevents fraud by imaging and then analyzing the images of the tokens as they are submitted for redemption to check their validity. Another is in surveillance cameras and systems. In this case, the surveillance cameras are equipped with optics to zoom in on the playing and monetary objects and detect whether they are valid (e.g., have the appropriate embedded data). Another is in the game machine itself, e.g., to check validity of tokens or game pieces used in or with the machine. In this case, the game machine has a built in reader that images the playing object or token, and analyzes the image for validity and/or for information or instructions that enhance the game playing experience. Another is a visible or hidden system to authenticate tokens at gaming tables where the table monitor, such as dealer in black-jack, can authenticate tokens, such as slide tokens over the imaging device to check for watermarks. Another is in an on-line gaming system, where players submit playing objects and/or personal identification documents to an image scanner or digital camera to access and initiate on-line gaming.

The readers may also be used to authenticate personal IDs and age of the gamblers as detailed below. For example, personal identification documents carry embedded data, such as a digital watermark, that indicates the player's age (potentially anonymously), player status (is this player preferred, or not preferred), player account, and player identity.

When embedding data on playing objects, the data should be hidden such that it does not impact the game. For example, for dice, the embedded data may be carried in images or surfaces of one or more sides of each die. Care is taken such that the die is evenly weighted, such as by spreading the same embedded signal across the entire surface area on all sides.

In addition to authentication, the embedded data enables a number of applications that enhance and control the gaming experience. In these applications, the digital watermark embedded on the object performs one or more of the following functions:
1. its presence is an instruction that initiates a game, and/or acts as a gestural input device when used in conjunction with a camera during a game;
2. it carries a variable bit payload that conveys information, such as:
   a. information identifying the gaming venue and linking to promotional opportunities for products and services at the venue (e.g., the information includes an index to a database entry that provides a web site address for a gaming venue web site with advertising, e-commerce opportunities, promotions for products and services at the venue);
   b. information identifying the monetary value and giving an index to a database for managing and refreshing monetary units on a monetary token, such as a re-usable cash card (this feature can also be used to provide credits for monetary units that are redeemable for games or other services or products sold at the venue in connection with promotions identified in item a above);
   c. an instruction to control a gaming machine or system (for example, instruction enables gaming machine to play a game). The embedded data can be used to make gambling games more interactive, and make the game unique to the user, venue, time (changing game experience over time in response to embedded data read from object during game play and context information such as user information, time-date, location.

d. information identifying the playing object, such as the value of the playing card (e.g., ace of spades) for enabling a gaming machine to recognize gaming object's identity and value automatically to automate game playing experience;

e. information that identifies the person that the object belongs to make the game experience unique to the player's identity (e.g., allow players different gaming experience based on prior patronage of the venue).

In addition to the systems and methods described in this document, the following patent applications provide additional examples of how to use embedded data in gaming objects to enhance the gaming experience: Ser. No. 10/139,147 (Now U.S. Pat. No. 7,502,759) and Ser. No. 09/630,243 (Now U.S. Pat. No. 6,735,324), which are incorporated by reference. In particular, the gaming platform described in U.S. Pat. No. 7,502,759 may be used in electronic and on-line gaming, and the applications for embedded data in U.S. Pat. No. 7,502,759 may also be used in electronic and on-line gambling machines. In addition, playing cards and other playing objects may be embedded with data for applications as described in U.S. Pat. No. 6,735,324 for trading cards.

While digital watermarks provide one mechanism for authenticating playing and token objects, additional technologies for authenticating physical objects may be used in combination with the embedded data. Some examples include optically variable devices (e.g., holograms, KINE-GRAMS®), smart cards and RF ID chips embedded in objects, non-visible wavelength inks, such as UV and IR, ghost images, fine line printing etc. For a description of how these and other features can be used in conjunction with embedded data, see 60/421,254, which is hereby incorporated by reference. 60/421,254 specifically describes how to use embedded data in identification documents, and this description can be applied to gaming objects as well, including tokens and playing objects.

Another related application of embedded data in gaming applications is embedding the data to enable tracking or tracing of an object to its issuance. For example, tokens are embedded with data identifying the source of issuance or the persons to which they are issued. This embedded data provides a mechanism to track tokens used in improper gaming activities to be traced back to the player and/or issuing authority.

Furthermore, the game token or cash card can be the room key. Alternatively, the room key can identify the player for gambling and the game token for authenticity. The room key or another ID document, such as a driver license, can verify the player's age and/or identify the player via machine readable codes, such as watermarks. This identification can help link the player to his or her gambling privileges. The casino, assuming it is associated with a hotel, can have different room keys for people under and over ages, such as 21, and gambling ranking, such as big spender, medium spender, and new corner.

Authenticating Physical Objects

The following sections describe a system and related methods for authenticating objects. The embedding process may embed data on any of the types of objects used in gaming applications. To determine whether an object is authentic, the methods and systems described in this document can be used to evaluate data embedded on the object, including labels, tags, stickers, paint, ink, coatings, holograms (Optically Variable Device), ghost images, RF ID tags, Integrated Circuit chips, and laminates on the object.

One implementation of these methods employs a form of steganography referred to as digital watermarking. However, other forms of steganography may be used as well. There are two principal parts of the authentication architecture: 1) a system for embedding data into the object; and 2) a system for authenticating the object.

Embedding Security Data Into a Product

FIG. 1 is a flow diagram illustrating a method for embedding data into an object. The maker or distributor of the product assigns an identifier, such as a serial number or digital watermark pattern to the object (the presence or absence of a unique pattern associated with a casino or gaming application may be sufficient for validation). The embedding process takes this identifier 20 and transforms it (22) into a form of data for embedding in the object. While the identifier need not be modified before embedding it, there are a number of reasons for doing so. One reason is to convert it into a more robust and inconspicuous form for embedding. Another reason is to make the embedded data more secure, i.e. more difficult for counterfeiters or pirates to replicate. Examples of transformations include conversion to binary or M-ary symbology, repetition, error correction, adding error detection and synchronization symbols, spreading symbols over or mapping symbols to corresponding carrier signals, such as a pseudorandom carrier (e.g., carrier generated by seeding pseudorandom number generator with seed).

The embedding process embeds the security data into a machine readable code on the object (24). In particular, the process steganographically embeds the data into the machine readable code on the object. A steganographic process embeds information on the object's surface such that is imperceptible or substantially imperceptible upon ordinary inspection, yet readable by machine.

One form of steganography is called digital watermarking. A variety of digital watermarking schemes may be used to embed the watermark onto the print media. Some example watermark encoding and decoding schemes are provided in U.S. Pat. No. 5,862,260, and in co-pending application Ser. No. 09/503,881, filed Feb. 14, 2000 (Now U.S. Pat. No. 6,614,914).

In digital watermarking of images printed on physical objects, there is a tradeoff between visual perceptibility and survivability of the watermark. In this application, the watermark is embedded so as to be sufficiently robust to survive analog to digital conversion, digital to analog conversion, and possible other forms of corruption, including geometric distortion, additive noise, and compression. The watermark may be encoded by altering the luminance or one or more other color channels of an image printed on the surface of the product. Alternatively, the watermark may be encoded using clear inks that modulate the microtopology of the product's surface or that are readable when exposed to light in non-visible wavelengths, like UV or infrared. Also, the microtopology of the product surface may be altered in the process of creating the product surface so as to embed a watermark. Alternative machine readable codes may be used as well, such as data glyphs, invisible bar codes, etc.

A digital watermark embedding process typically involves several operations. For example, additional data may be appended to the security data, such as synchronization symbols, error detection codes, etc. After adding this data, the security data includes a sequence of symbols for embedding into the product. Additional operations include error correction and other forms of symbol encoding (e.g., convolution codes, turbo codes, BCH codes, Reed Solomon encoding, M sequences, gold sequences, etc.). These operations transform the original message sequence into a message signal. The message signal may then be further replicated and modulated using spread spectrum modulation techniques. For example, the message signal may be spread over a pseudorandom number or set of pseudorandom numbers and repetitively scattered throughout a host signal.

The host signal (sometimes referred to as the cover signal) is the signal in which the embedded data is hidden. This might be an image printed on an object, label or package, a layer of visible or invisible inks, line art, text, surface topology of an object, etc. The watermark signal may be replicated in several different contiguous or overlapping regions of the host signal. Each instance of the watermark at these regions can be associated with a corresponding imperceptible watermark template, synchronization or orientation signal that enables the decoder to detect the presence of the watermark and determine its orientation parameters such as translation (x, y coordinates of an origin), rotation, scale, shear, differential scale, etc.

To embed the message signal, an embedding function subtly changes the host signal. Digital watermarks usually operate on a digital form of the host signal to create a digital watermarked signal, which is then converted to analog form. However, the digital watermark may also be applied in the analog domain. A variety of embedding functions have been detailed in the literature about digital watermarking. These functions may be additive, multiplicative (adding or multiplying a message signal with the host signal), or some other function, such as a non-linear quantization function. The quantization function embeds a message symbol (e.g., binary or M-ary) by quantizing a sample value or a characteristic of a set of sample values of the host signal to a quantization level associated with the symbol being encoded. To decode the symbol, the watermarked signal is captured and evaluated (e.g., re-quantized) to determine which quantization level a sample or characteristic of a set of samples most closely corresponds to. This quantization level is then mapped to the corresponding symbol.

The embedding functions may be applied to image samples or characteristics in the spatial domain or some transform domain, like Discrete Cosine Transform, Discrete Wavelet Transform, Discrete Fourier Transform, KL transform, etc.

The watermark signal need not be hidden in another signal. Instead, it can be formed of graphical elements, such as line structures, dots, symbols, etc. that correspond to the watermark signal. This signal can form a visibly appealing texture or graphical symbol, logo or seal.

For enhanced security, various elements of the embedded data may be encrypted. Some or the entire watermark message, including the security data in the message may be encrypted. Various keys used to encode the watermark may be encrypted as well. For example, a key that defines the location of the watermark signal in the host signal may be encrypted. A key used to decode the spread message signal (e.g., a pseudorandom number) may also be encrypted.

In implementations where instances of the watermark signal are repeated in the host signal, a key in the message payload of one instance of a watermark signal may be used to decrypt a message, such as the security data, in other instance of the watermark signal. The key may be included in a message payload by appending the key to the message or combining it with the message using some function such as an XOR, or multiplication operation that combines the key with the message to create a composite message.

Keys used to decode the watermark or its message payload may also be derived from the host signal itself or from another watermark in the host signal.

Digital watermarks provide a low cost, yet secure method of embedding security data into an object. The embedding process can be integrated into the process of printing the object or materials placed on the object, such as labels, coatings, laminates, stickers.

For example, for each object or lot of objects, the printing process may be adapted to print an image embedded with the object's or lot's identifier. This process may be integrated in the mass production of a variety of printable objects, like chips, cards, tokens, stickers.

Authenticating a Product Using Embedded Data

Figure 2:
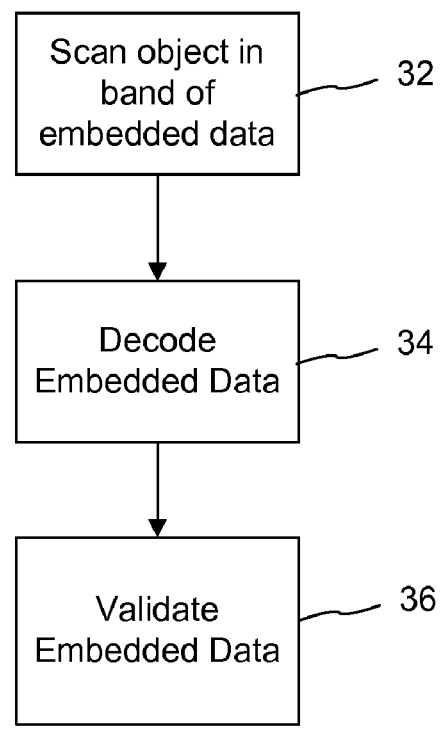
FIG. 2 is a flow diagram illustrating a method for authenticating an object using the embedded object identifier.

FIG. 2 is a flow diagram illustrating a process for authenticating an object using embedded data. The authentication system includes a user interface, scanner and embedded data decoder. In the case where the embedded data is encoded in a digital watermark, the system may be implemented in a personal computer equipped with an imaging device, such as a CCD camera or scanner, or as a stand-alone device that integrates into slot machines, card tables (which the dealer can slide chips over to be read indiscriminately) and money exchange machines.

In general, for fragile watermarks, the detector determines if the token contains the watermark. If it does, the token is authenticated and the desired action, optimally transparently, is allowed for the user. If it doesn't, the authentication fails. The user and/or security may be notified.

For robust watermarks, the detector determines if the embedded data matches the desired data, such as the ID for the casino and/or amount of the token. If the data matches, the token is authenticated and the desired action, optimally transparently, is allowed for the user. If it doesn't match, the authentication fails. The user and/or security may be notified.

More specifically, authentication begins by scanning the product with a sensor (32), such as a CCD camera, to capture a product scan. Imaging devices that operate outside the visible band may be used in cases where the embedded data is hidden in a non-visible band, such as infrared, ultraviolet, RF, microwave, radar, ladar, etc.

Next, the system decodes the embedded data from the scan (34). In the case of security data embedded in digital watermark on the object, the system scans one or more image frames of the object. It then proceeds to detect the watermark in this image signal. Finding a watermark, it decodes the watermark message, including any identifier, index (including pointer or address), instruction, etc. carried in that message.

To validate the security data (36), the authentication system compares the extracted data with data expected for valid objects. If the extracted data satisfies pre-determined criteria, then the system deems the object to be valid. This validation process may include a variety of functions, such as querying a database, comparing an extracted identifier with an expected identifier, extracting metrics from watermark signal measurement to a classifier for determining whether the object is an original or fake, etc. In some cases, failure to detect the embedded data indicates an invalid object.

A variety of actions may be triggered by the outcome of the validation process 36. One action is to convey the output of the validation process to the user via a user interface, such as audio output, graphical user interface, etc. This type of operation could be used to authenticate objects in a surveillance system, gaming machine, hand-held reader, token redemption machine, etc. having an image sensor and hardware or software for executing the authentication operations.

The security of the embedded data can be enhanced through the use of copy detection technology. Copy detection technology can be used to detect whether a counterfeiter has made a copy of the object bearing the embedded security data. For example, a counterfeiter might try to circumvent the authentication system by making a high quality copy of the image bearing the embedded data using a scanner or copy machine, and then printing that image on a counterfeit object.

The copy detection technology may be used to embed the security data (e.g., a watermark that is used to detect copying and convey security data) or may be separate from the security data (a separate watermark or other auxiliary data that is used to evince copying). One form of copy detection technology is a digital watermark that is altered in a predictable way when copied with a scanner, copy machine, or other imaging device. Such imaging devices apply a transformation to an image (e.g., an analog to digital sampling, color transformation, etc.) that can be detected by a watermark designed to change in a predictable way to such a transformation.

An example of copy detection technology is a "fragile" watermark. The watermark is called fragile because the strength of the watermark signal in a copy of the watermarked original object is less than the strength in the original object. To detect copying, the embedded data decoder attempts to detect the fragile watermark. If the fragile watermark is not present, or has a measured strength that falls below a threshold, then the decoder deems the object to be an invalid copy. There are a variety of ways to measure strength of a watermark signal. One way is to measure the extent of the correlation between an image of the suspect object and a reference fragile watermark signal.

Rather than using a separate fragile watermark, the authentication system may detect copying based on attributes of the watermark used to carry the embedded data. For example, the watermark may include a synchronization or orientation signal used to detect the presence of the watermark and determine its orientation. Copying of a watermarked object may be detected by measuring changes in the watermark orientation signal, such as geometric deformations, or modifications in the power or energy of the orientation signal.

Since the watermark carrying the embedded data is made to survive distortion due to normal scanning operations required to read the watermark from an object, a fragile watermark may not accurately discern copying by a counterfeiter from these normal transformations. However, the watermark payload may be embedded in ways that survive these normal operations, yet still carries information from which copying can be discerned. For example, the payload of the watermark may be robustly encoded to withstand transformations due to scanning, geometric distortion, etc., yet convey information from which copying can be discerned.

One type of copy detection payload is an identifier that is related to some other characteristic of the object (another machine readable code, like a bar code, magnetic stripe, hologram, etc.).

Another form of copy detection is to scramble or encrypt part or all of the watermark payload in a predictable, yet different manner from one product to the next. This may be accomplished using a cryptographic hash that scrambles the payload using the product number or some other product specific attribute as a seed.

Another way is to scramble the location of the watermark or the relationship between different parts of the watermark using a cryptographic function. For example, the watermark may be replicated in blocks of an image, where each block encodes a similar payload, yet encodes that payload in a different manner based on a secret key. Each block may include an orientation signal that enables the decoder to properly align the image data for that block. In each block, the watermark payload may be scrambled differently, such as using a seed for a cryptographic scrambling function based on block location, block number, or data from the payload of another block, etc.

While the decoding process can use the orientation signal to align each block, it may not be able to discern the precise alignment of blocks in the scanned image relative to blocks in the original watermarked image. As such, the decoder may only be able to recover the relative location of blocks to each other, but not their absolute location in the original image. To address this challenge, the variation of the watermark or its payload across the image can be made in a relative manner from one block to the next using a secret key that defines the relationship between blocks. Relative changes between neighboring blocks enable the decoder to extract the payload from one block using information from one or more neighboring blocks. For example, the payload of one block may be altered using the payload of one or more adjacent blocks. The relationship between the payloads of adjacent blocks may be defined according to a cryptographic function. For example, the payload of one block may be used as a key to decoding an adjacent block.

A related enhancement is to use keys for decoding the watermark, the watermark payload, or digital content that are dependent on the host signal. This type of host signal dependent key makes it difficult to copy the embedded security data from one object to another. To illustrate this enhancement, consider embedded security data in an image watermark on object. One form of image dependent key is a key that is derived from a property of the image that is insensitive to the changes due to the watermark embedding process and recoverable in a watermark decoding operation on the embedded product.

An example of this type of key is a number that is derived from statistical properties of the image that are insensitive to the watermark embedding process, like the relative power differences between blocks of the image. The key could be, for instance, a binary number computed by comparing the power of a given block with a set of other blocks, such as those in a predetermined neighborhood around the given block. The comparison operations yield a one or zero depending on whether the power of the given block is greater or less than the selected neighbors. Each comparison operation yields a single bit in the key. The key may then be appended or combined with the watermark payload.

At the time of authentication, the watermark decoding process employs a synchronization or orientation signal to align the image data. Then it re-computes the image dependent key by repeating the key derivation operation as computed in the embedding process. The key computed at the time of decoding may be compared with the embedded key to check authenticity of the embedded data. Other properties that are insensitive to the watermark process may be used as well.

Another enhancement that can be used as a form of authentication and copy detection is to embed two or more different watermarks that have a known relationship with respect to each other. One such relationship is a predetermined offset in the spatial image domain, or some other transform domain, like a Discrete Fourier Transform, Discrete Cosine Transform, Discrete Wavelet Transform, or some re-sampling of one of these domains, like a log, log-log, or log-polar re-sampling. This known relationship changes in a predictable way when the watermarked object is copied. Thus, during the authentication process, a watermark decoding process detects the watermarks and computes this relationship between the watermarks. It then compares the computed relationship with the known relationship to determine whether some unauthorized transform likely occurred, such as copying.

One way to detect that a detect whether a printed object (e.g., a token, chip, card, label, ticket) has been copied is to embed two watermark signals with different characteristics that change differently in response to reproduction operations such as photocopying, or digital scanning and re-printing. To differentiate a copy from an original, the watermark decoder measures the characteristics of both watermarks in a digital image scan of the printed object, and detects a copy by the changes in the watermarks attributable to reproduction operations. Examples of this approach are described in U.S. patent application Ser. No. 09/433,104 (Now U.S. Pat. No. 6,636,615), entitled Methods and Systems Using Multiple Watermarks, by Geoff Rhoads and Ammon Gustafson, which is hereby incorporated by reference. Among the approaches listed in this document are:

1. high and low spatial resolution watermarks;
2. one watermark with a geometrically linear assignment of pixels and another with a random assignment of pixels;
3. low and high power watermarks; and
4. one watermark with standard a RGB to HSI-HSI to RGB transform and a second watermark that is biased before being transformed from HSI to RGB.

In the first case, the high resolution watermark is degraded more than the low resolution watermark. The watermark detector detects copying by measuring the change in the power ratio between the two watermarks in a suspect image relative to the original ratio, which is set at embedding and provided to the detector. In the other cases, the detector detects copying by observing changes in the relative strengths of the detected watermark signals with respect to the original relationship between the watermarks.

Similar techniques may be used to create a fragile watermark that evidences copying due to changes in the fragile watermark's strength relative to its original strength in the un-manipulated original printed object. Also, the fragile watermarks may be adapted to carry a message payload. Finally, the fragile watermarks may be spatially replicated in contiguous blocks of the image. The detector can then isolate the spatial location of blocks of the image where the fragile watermark or watermarks evidence tampering.

The above sections refer to encryption and decryption operations. A variety of cryptographic technologies may be used to implement these operations. Some examples of encryption technologies include RSA, DES, IDEA (International Data Encryption Algorithm), skipjack, discrete log systems (e.g., El Gamal Cipher), elliptic curve systems, cellular automata, etc.

The above sections also refer to hash operations and in some cases, cryptographic hashes. Cryptographic hashes are functions used to convert a first number into a relatively unique second number in a manner that makes it difficult to derive the first number from the second number. Examples of hashing functions include MD5, MD2, SHA, SHA1.

Watermark Embedding and Decoding System

Figure 3:
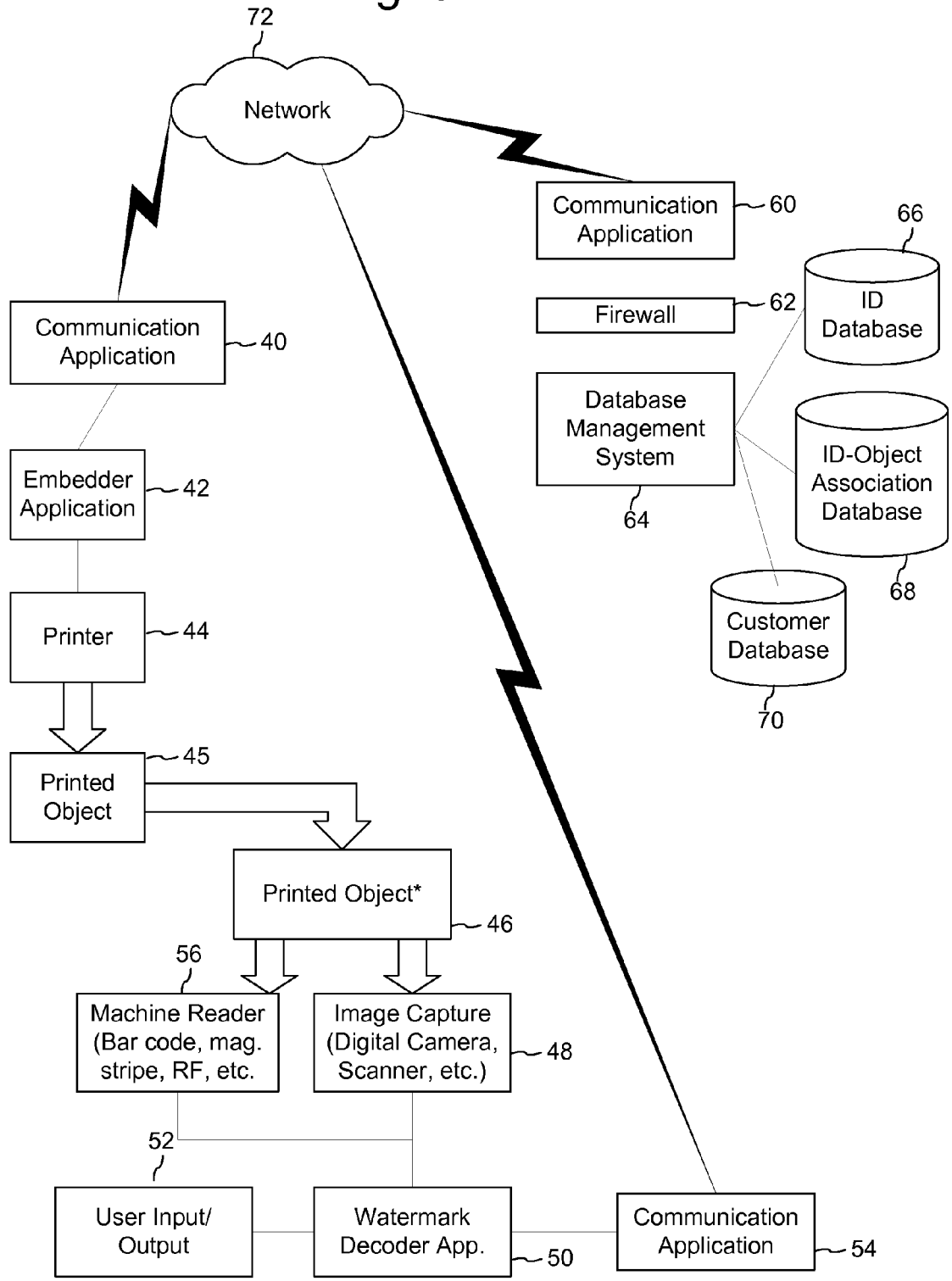
FIG. 3 is a diagram of a system architecture for creating and verifying the authenticity of printed objects using digital watermarks for authenticating the objects and distinguishing between copies and originals.

FIG. 3 is a diagram illustrating an architecture for watermark embedding and decoding for objects. As described further below, this architecture applies to a variety of object types and application scenarios. Before discussing the various object types and applications, this section begins with a description of the system architecture. The implementer may adapt the system for a particular application using one more components of the architecture. Later sections describe a number of example application scenarios based on this architecture.

There are three primary components to the system: 1. a watermark embedding system (40-44) that embeds a digital watermark into an image and prints the watermarked image on an object 45 (e.g., token, chip, card, label, tag, coupon, ticket, pass, identification document, certificate, etc.); 2. a watermark decoding and verification system that reads the watermark from a potentially manipulated version of the printed object 46 and verifies its authenticity (48-56); and 3. a database system (60-70) that performs a variety of functions, depending on the application. These database functions include managing information embedded in the printed objects (e.g., identifiers), managing electronic transactions associated with assigning identifiers and using them in the printed objects, assisting in verification of the printed objects, and maintaining event logs and reports of object usage. The third component, i.e. a database system, is optional for local authentication.

In FIG. 3, these three primary components are interconnected via a network 72 such as a local area network or wide area network, e.g., Internet. However, the database functions can be built into the embedder and decoding systems to perform data management and data look up operations locally within those systems.

The embedding and decoding systems are implemented as software applications for an open hardware platform or as special purpose systems. Examples of an open platform implementation include a software application for an operating system like Microsoft Windows or Linux that end-users install on a computing device with a connection to a network and printer (for embedding) or scanner or digital camera (for decoding and verification). Examples of a special purpose platform include a combined software and hardware system with a network connection (possibly a private network) and a special purpose printer for printing tokens, playing objects, chips, cards, etc.

Implemented as a software program or a combination of hardware and software, the embedder application 42 takes an image for printing on an object and embeds a digital watermark in the image comprising an array of sample values (halftone dots or multilevel per pixel samples). Preferably, the digital watermark is substantially imperceptible to a viewer of the image, but that is not a requirement in all applications. The embedder embeds a message payload into blocks of pixels of an image. Depending on the size of the image and the payload, the message payload may be replicated throughout the image several times to increase robustness. In certain applications, the embedder embeds an identifier into the message payload that is uniquely associated with a printed object or set of similar printed objects. This identifier may be used to identify the object, to link the printed object with information about it stored in a local or remote database, to act as a unit of value or link to a monetary value associated with the object (e.g., a token, chip, ticket, cash card, pass, a coupon, etc.), to authenticate the object, to track the usage of the printed object (e.g., to monitor usage and redemption), etc.

The embedder may also embed into the watermark payload attributes of the image printed on the object, such as a perceptual hash of the image. In addition, it may embed attributes of the bearer of the object such as name, user ID number, age, etc. or other information into the watermark message payload. Also, it may embed text data that is printed on the object (like a document ID, etc.) into the watermark payload. In each case, the embedder may embed text or numeric data representing the attributes themselves, a hash of this data, or a losslessly compressed version of this data.

Additionally, the watermark payload may include a time stamp or a link to a time stamp in the database. This time stamp is useful in verification operations to check the age of the printed object, and process the object according to its age. In some applications, like tickets, cash cards, tokens, etc., the printed object becomes invalid and inoperable after a certain period elapses.

For verification, the decoding system derives these attributes from the printed object and compares them with the information in the watermark payload or in the database, which is referenced by the identifier in the watermark payload. A verification module performs the process of verifying authentication attributes derived from the object and elsewhere (e.g., from the database, from the user, etc.). This module may be located in the decoding system, a remote database, or distributed in both systems.

The watermark protocol defines the nature of the watermark signal and its payload. For example, the protocol specifies keys used to encode and decode the watermark, symbol coding schemes like error correction coding, M sequences and gold sequences, error detection schemes (convolution codes, Reed Solomon codes, BCH codes, etc.), spread spectrum modulation and associated spreading keys, synchronization codes, etc. The protocol may vary from one application to the next. The protocol may define a single robust watermark, a single fragile watermark, or some combination of fragile and robust watermarks. For example, the object may have a single fragile watermark (per image block). This fragile watermark may carry a payload, or simply act as a copy detection watermark that degrades when the printed object is reproduced in a photocopy machine or by scanning and reprinting. The object may have a single robust watermark (per image block) that carries a message payload. Alternatively, the object may include a robust watermark for carrying a message payload, and a fragile watermark that acts as a copy detection watermark. The robust and fragile watermarks may each be implemented as two or more different watermark signals. Also, the watermark signals may include attributes, such as a template, calibration signal or other characteristic features or patterns that are used to correct for geometric distortion in capturing an image of the object for watermark decoding. In some applications, it is useful to ascertain which portions of the object have been tampered with. One way to do this is to repeat a fragile watermark in spatial blocks of the image printed on the object. Then, in the decoding process, a watermark detector indicates which blocks have a detectable fragile watermark and which do not. Another approach is to embed a fragile watermark with a different message payload in each block. Then, in the decoding process the detector reports all of the fragile watermark payloads that it has successfully recovered. The missing payloads indicate the blocks that have been tampered with.

After embedding the watermark in the image, the embedder passes the watermarked image to the printer 44, which in turn, prints the image on an object to create the printed object 45. The watermark survives the transformation from a digital image to a physical printed object, and is typically spread over surface of the object (e.g., repeated in contiguous rectangular blocks throughout the object), which may carry other information, such as the host image in which the watermark is embedded as well as other markings and text. This object undergoes typical or malicious manipulation, such as wear and tear, soiling, crumpling, photocopying, scanning and reprinting, etc. To depict this manipulation, FIG. 3 graphically depicts the printed object 45 being transformed into a potentially altered version of the object 46 after manipulation.

The watermark decoding system includes an image capture device 48, watermark decoder application 50, and user input/output devices (like a keyboard, display, etc.). It may also include a machine reader 56 to read other machine readable codes from the object (2D or 1D bar code, a magnetic stripe, an RF tag, an integrated circuit chip carrying data about the object, organic transistor, etc.). The information conveyed in these other machine readable codes may be related to the information conveyed in the watermark payload (e.g., through a predetermined mathematical relationship such as one being the hash of the other) for authenticating the printed object.

The watermark decoder employs watermark detecting and reading technology described and referenced in this document to detect a fragile watermark if present, and to read the watermark payload if present. For more on watermark embedding, detecting and reading operations, see U.S. Pat. No. 5,862,260 and U.S. application Ser. No. 09/503,881 (Now U.S. Pat. No. 6,614,914), which are incorporated by reference. Depending on the implementation, the watermark decoder may perform one or more verification processes such as: checking for the presence of a fragile watermark or watermarks, measuring the strength of the watermark signal, or comparing the payload information with other verification information entered by the user, read automatically from other machine readable features on the document, printed on the face of the document or fetched from a database, etc. The decoder may also communicate watermark payload information to the database, or use the watermark payload information to look up additional authentication information in the database via a network connection.

The watermark detection and/or payload reading of one or more watermarks in the image may be based on user provided key information, such as a password, which may be combined with an image hash or other information on the object to provide a watermark detection key (e.g., a pseudorandom pattern) or a watermark payload descrambling or decoding key.

As detailed further below, the watermark may also link the printed object to a database entry storing information about the user. The decoding system or database compares the user information in the database entry with that supplied by the user to verify that the printed object is being presented for verification by the proper user. This feature is useful to verify that certain types of items, like tickets, identification documents, cash cards, etc. are not only authentic but also are being presented by the appropriate person. This user specific information is associated with the identifier embedded in the printed object by the embedding system, which communicates the association between the ID and the specific user to the database at the time of embedding.

As shown in FIG. 3, both the embedding and decoding systems may take advantage of a database for a variety of functions. This database may be local or remote as shown in FIG. 3. The embedding and decoding systems shown in FIG. 3 include a communication application (40, 54, respectively). This application enables the systems to communicate with the database system via a network. For the typical implementation adapted for computer networks like the Internet, this communication application represents network communication software and network interface hardware to connect computers on a network. For example, the communication application implements a TCP/IP protocol, and uses standard communication technologies like SSL, HTTP, and XML to pass information. The specific connections can be made over a public or private network, WAN, or LAN. Both the embedding and decoding system can be designed to be portable or fixed at one location, either with a connection to the network that is always on or that is established on demand.

The database in FIG. 3 communicates with the embedding and decoding systems via a compatible communication application 60. For example, an application adapted for the internet uses standard Internet communication protocols, and if security is desired, a secure connection like SSL. As shown, the database may also communicate with the other remote systems through a firewall that restricts communication to messages from authenticated machines and/or users. To authenticate a machine, the firewall only allows message packets from machines with a particular machine address (e.g., a particular set or class of IP addresses). To authenticate individual users of the embedding and decoding systems, the firewall requires the user to enter the appropriate password and log-in information. For some applications, the database may be public, in which case, these security measures are not necessary.

Behind the firewall, a database management system 64 manages requests for embedding transactions and verification transactions. For certain applications, it maintains an ID database 66 of identifiers (IDs). These identifiers are embedded in the watermark payload of printed objects and used to link back to a database entry for verification or other functions (like linking to a web page or e-commerce transaction, etc.).

The embedding system gets IDs for embedding either in blocks or on demand from the ID database via the database management system. The embedding system, for example, may request a block of IDs for later embedding into watermarked images to be printed on objects. Alternatively, the embedding system may request IDs as needed in a real time connection with the database. In some applications, the database management system implements an electronic transaction to charge a customer's account for each ID or block of IDs that have been requested or registered with that customer. The transaction is associated with the customer via a secure transaction involving customer authentication via a password, and machine authentication via a particular machine address or signature supplied by the embedding computer or printer.

The database entry may include information to verify the authenticity of the printed object, such as features of the object that can be compared with the object to check for authenticity (such as a object number, a machine readable code on the document, a hash of text on the object, a hash of perceptual image features of the document image, etc.). The database may also include information to verify the authenticity of the bearer of the printed objects, such as a special user password or user ID, a picture of the user, or other biometric data of the user (hand writing signature, iris or retinal scan, fingerprint, voice signature, key stroke signature, etc.). This information is captured from the user or embedding system at the time of embedding and added to another database called the ID-Object association database 68.

In particular, the embedding application records the IDs along with the related object and/or user authentication information at the time that the IDs are embedded into the printed objects. If the embedder application maintains a real-time connection with the database, it transfers the ID along with the associated authentication information back to the database management system 64, which in turn, creates a database record in the ID-object association database 68. The embedder application may also implement a store and forward approach, where it records the ID-authentication information associations, and forwards them to the database when a connection is available.

The embedding system may also associate additional information or behavior with an object. For example, the customer may want to associate a particular behavior, such as return of a web page, execution of program or machine function, with a printed object so that the behavior is executed in response to reading the embedded data.

For some applications, the database management system is configured to have a public and private side. The public side is used to link watermarked objects to related information, by returning the related information just like the web address in the previous paragraph. The private side is used for authentication operations, such as checking whether an object is authentic, checking whether the bearer of the printed object is valid, etc.

In addition to linking to authentication information, the identifiers may also serve the function of representing units of value associated with the object. For example, the printed object may be a cash card, token, ticket, etc. At embedding, the embedding system associates the number of units of value to be associated with the printed object, and charges the buyer's account (electronically debits the buyer's account by the units of value associated with the printed object). At the decoding side, the decoder application 50 extracts an embedded identifier from the watermark in the image on the object, and connects to the database to determine the amount of value associated with the identifier in the database. The database management system decrements the number of units remaining for the object with each use of the watermarked object. When the number of units remaining drops to zero, the database management system sends back a control signal indicating that the watermarked object is no longer valid.

One variation to this approach is to program the database management system to return control signals to the decoding system for display to the user. In this variation, the control signals warn the user that the number of units remaining has dropped below a threshold, and offer the user the opportunity to buy more units via a secure electronic transaction over the network, such as a credit card transaction. When the user buys more units and refreshes the object in this manner, the database management system increments the number of units associated with the printed object.

The database further includes a customer database 70 to maintain customer account information, such as customer passwords for user authentication and financial transaction information associated with the purchase of identifiers associated with embedding transactions.

In some system designs, the design requirements dictate that the database management system act as a router to other secure databases controlled by different entities. For example, a number of different customers may wish to maintain their own authentication databases, and databases for controlling use of the printed objects under their control. In this case, the database management system 64 uses one or more layers of indirection to link the customer's database to the decoder application 50. In particular, the ID-object association database 68 stores a relationship between an ID and a customer system (e.g., the network address of the computer system controlled by the customer). For authentication or other actions triggered by the ID in the watermark, the database management system 64 looks up the customer's computer address in the database 68 using the ID from the watermark, and either forwards the ID to the customer's database system using the computer address of that system, or returns the customer address information to the decoding system, which in turn establishes a secure connection with the customer database. In the first case, the database management system also forwards a computer address of the decoding system to the customer database (e.g., the IP address) so that it can respond directly to the decoder application 50 running in the decoding system.

Using this approach, the database management system can act as a router to send transaction requests to many different customer databases in response to decoding a watermark payload. Some objects may even be associated with more than one customer. For example, when a user presents a card, token or ticket for verification, the decoding system sends the ID extracted from the watermark to the database management system 64, which in turn, forwards it to the issuer's computer for authentication. The database management system may also link the decoding system to another party's computer, such as the casino's web site for more information (e.g., promotional information, information about the object, electronic commerce opportunities to buy related products or services, etc.)

As noted previously, the decoding system does not require a connection to a local or remote authentication database to authenticate the printed object. In some cases, the object can be authenticated by checking the strength of or the presence of a fragile watermark signal. Also, the watermark payload can be designed to carry authentication information like a hash of the watermarked image on the object. To authenticate the image, the hash is decoded from the watermark and compared with a new hash computed of the image of the object (optionally realigned to correct for geometric distortion relative to the orientation, scale and position of the image data when the embedded hash was computed). The sensitivity of the hash to changes can be tuned to detect modifications due to photocopying, scanning, or re-printing. Preferably, the hash is computed of features of the image, such as energy or power at selected spatial frequencies or certain color attributes that degrade predictably in response to photocopying or printing operations. Such an image hash may allow benign image editing like brightness or contrast changes, but detects content additions or deletions to the image. Geometric distortion introduced by copying may also be detected by observing aspect ratio changes of certain visible or hidden fiducials printed in the image.

Another form of authentication is to use certain image features, text content on the printed object, or information provided by the user (such as password, user ID, or other user specific information) as a key to create a watermark pattern (e.g., as a key to a PN number generator that is used to create a noise image that is adapted to the image and added to it). At authentication time, the information used to create the key is obtained from the object, the user, the authentication database, or a combination of these sources. The decoding system then creates the watermark signal from the key, and if the watermark is present, the printed object is authentic. If it is not present, the printed object is deemed not authentic.

Cards

The system may be used to create and verify a variety of types of cards, like cash cards, identification cards, access cards, age verification cards, photo IDs, etc. The decoding system can also be used to control access to certain places or things.

Digitally Marked Objects as Monetary Tokens

The subject matter in this section is related to that disclosed in co-pending U.S. application Ser. No. 09/343,104, filed Jun. 29, 1999 (abandoned); 09/571,422, filed May 15, 2000 (Now U.S. Pat. No. 6,947,571); and 09/697,009, filed Oct. 25, 2000. Each of these patent applications is hereby incorporated by reference.

As disclosed in the above-cited applications, physical objects can be encoded with digital data. When sensed by a compliant device, the digital data can be used to direct a web browser to an internet web page corresponding to the object. The digital data can also be used to direct or to enable an appliance. The term appliance is used broadly herein to include many apparatus and devices, such as computers, jukeboxes, cash registers, point-of-sale terminals, vending machines, dispensing machines, gates, transportation systems, pay-for-view devices, vehicles, rides, games, pay phones, gaming machines, mechanical devices, and electrical devices, to name just a few.

One form of encoding is accomplished with digital watermarking. Digital watermarking systems typically have two primary components: an encoder that embeds the watermark in a host media signal, and a decoder (or reader) that detects and reads the embedded watermark from a signal suspected of containing a watermark (a suspect signal). The encoder embeds a watermark by altering the host media signal. The decoding component analyzes a suspect signal to detect whether a watermark is present. In applications where the watermark encodes information, the decoder extracts this information from the detected watermark.

One such technique marks objects in a generally human-imperceptible manner using digital watermark technology. For example, a photograph in a magazine advertisement can be subtly changed, in local luminance detail, to encode a 32-bit number (an object identifier). A reading device (e.g., web cam, scanner, etc.) can sense image data corresponding to the photograph or the like. An associated computing device decodes the 32-bit object identifier from the sensed image data. The device can then transmit this identifier to a database. The database uses the identifier to access a corresponding database record. In the record is information relating to the object. The database transmits this information back to the device. In one embodiment, the database is remotely located, and the information includes a URL address. In this case, the device, in turn, launches a web browser (or if already launched, then directs the running web browser) to the specified URL. The web page at that URL is then displayed to the user who initially presented the object to the web cam. In another embodiment, the database is locally maintained and includes information to direct the device.

Data embedded within an object can be used to implement monetary tokens. The data preferably includes data relating to a monetary unit, credit value, or access token. A reader terminal (e.g., in a casino, gaming device, etc.) senses the data and responds in a manner specified by information in an associated database record. Instead of directing a web browser to an associated web page, the information returned by the database can be used, e.g., as a monetary equivalent or token. The monetary tokens can be used to gamble, purchase goods, services, or to activate an appliance (e.g., video game, jukebox, children's rides, carnival-like games, vending machines, etc.).

The encoded articles can be produced in large volume—all encoded with the same digital data. The response to this fixed data can be changed daily, weekly, etc., by updating data in the database accordingly. Thus, an inventory of objects produced months ago can be used in conjunction with varying values or promotions. Alternatively, the objects can be separately encoded with unique data. This unique data can then be used to manage individual access and/or to restrict use (e.g., a one (1) time use, five-uses, etc.).

A method of activating an appliance is provided according to still another aspect of the present invention. The appliance includes a watermark detector. The method includes the steps of: i) presenting a digitally watermarked object to the detector; ii) in the detector, detecting and decoding the watermark; and iii) activating the appliance in accordance with the watermark.

In another aspect, a physical object is used as a monetary equivalent. The physical object includes plural bit data encoded in the form of a digital watermark. The plural bit data is used to link to additional data, the additional data comprising monetary information.

A method of doing business is another aspect of the present invention. The method includes the steps of: i) reading a digitally watermarked object, the watermark comprising at least an identifier; ii) accessing additional information via the identifier, the additional information comprising monetary data; and iii) using the additional information to facilitate a transaction.

An object is encoded with a digital object identifier (e.g., plural-bit data). The identifier is preferably recorded in a database and information is linked to the identifier. The linked information may include information corresponding to a monetary unit, credit amount, and/or access level. The object is presented to a compliant device (e.g., a device capable of reading and/or decoding the encoded object identifier), which reads the object and decodes the identifier. Preferably, the database is queried to determine the linked information. The information is then used to gamble, purchase a good or service, activate a device, permit access, etc.

As an alternative arrangement, the article is encoded with additional information. The additional information may be included as part of the identifier or may be included as a payload. The additional information preferably includes plural-bit data corresponding to monetary units, credit amounts, or access levels. This additional information is decoded and used to gamble, purchase a good, service, activate a device, permit access, etc.

In yet another arrangement, the identifier includes the access token. The access token (e.g., identifier) is recorded each time it is used. These records can then be used to facilitate payment for access or purchases via the access token.

Figure 4:
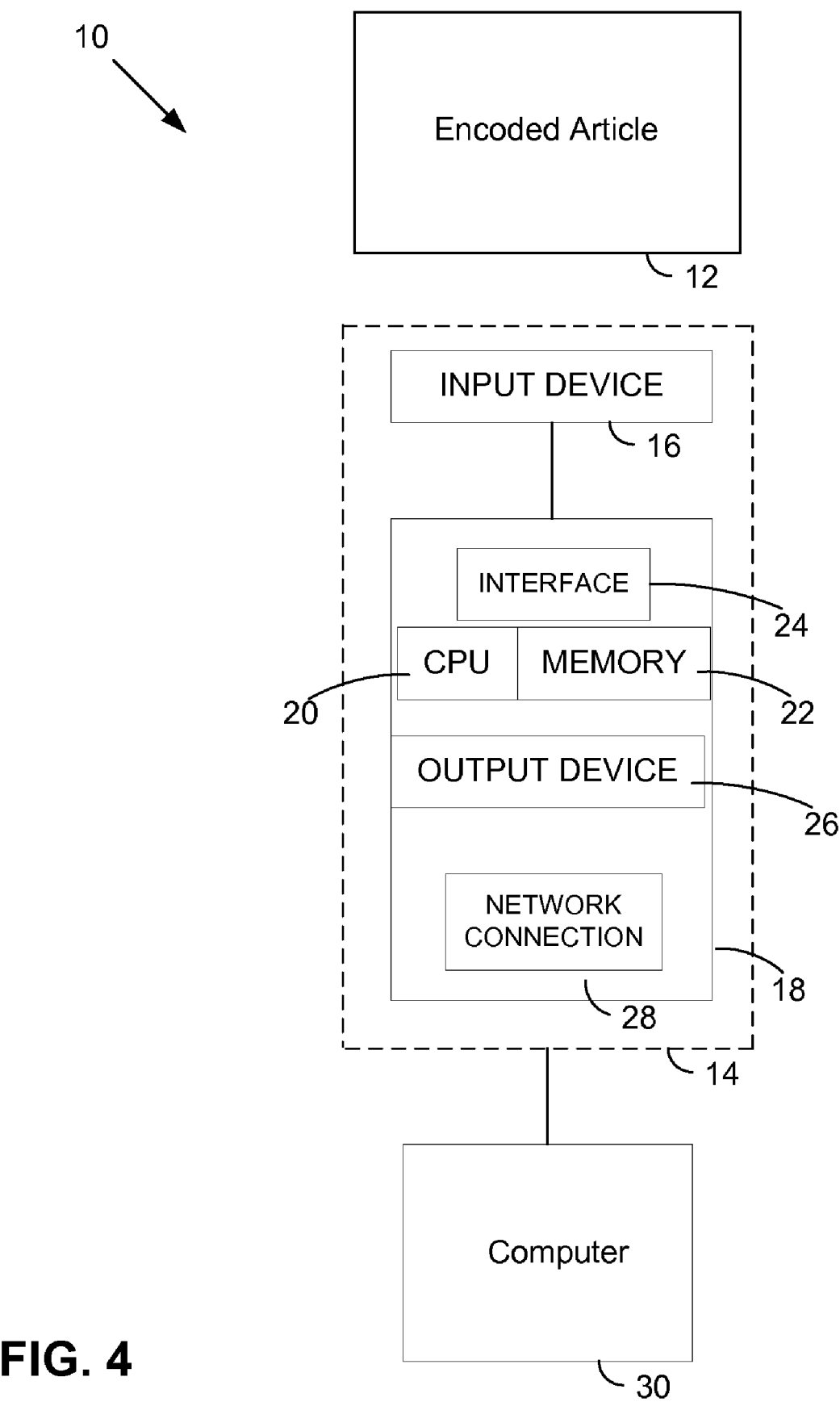
FIG. 4 illustrates a watermark decoder according to an illustrative embodiment.
Figure 5:
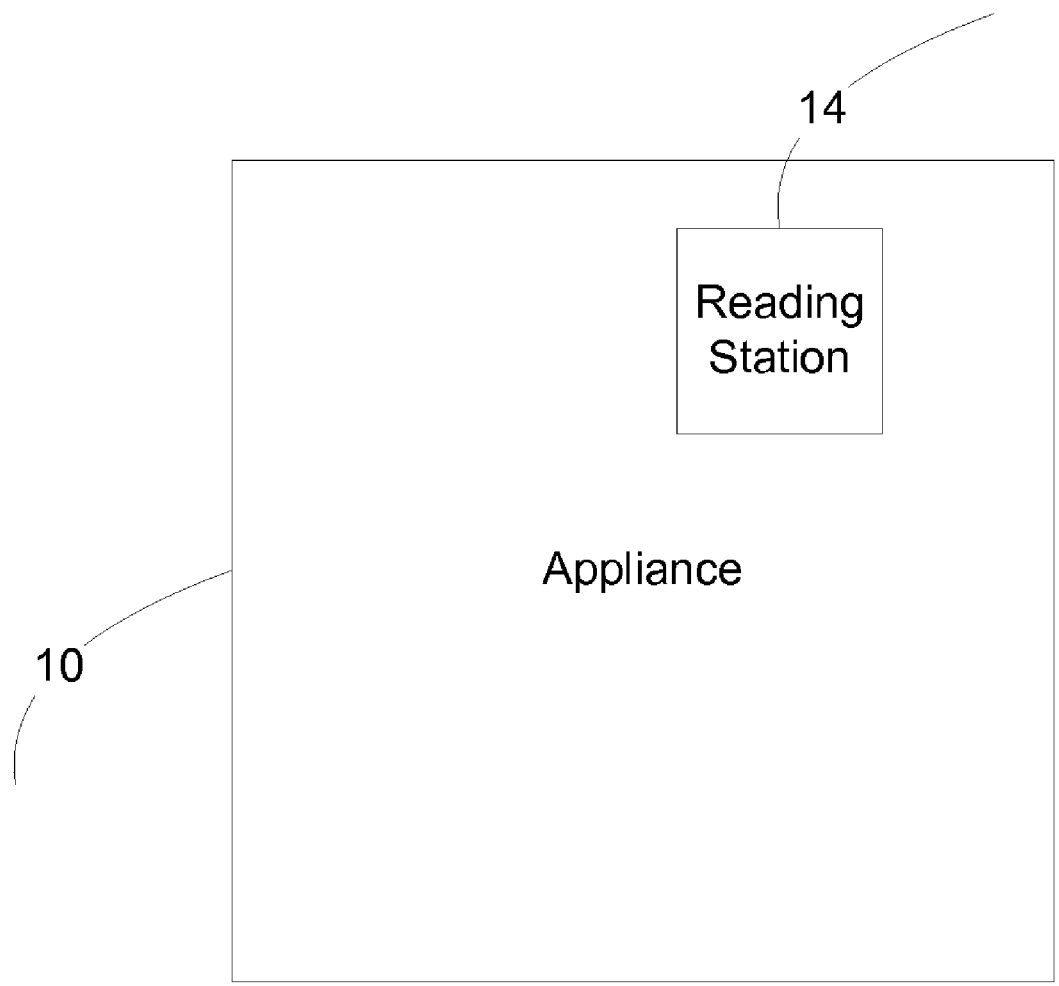
FIG. 5 illustrates an appliance including the watermark decoder.

With reference to FIG. 4, an encoded article 12 is presented to a reader station 14 for reading and decoding. The reading station 14 may be incorporated with (or otherwise in communication with) an appliance 10, as shown in FIG. 5. The reader station 14 includes an input device 16 and a processor 18.

The input device 16 can take various forms, including a flatbed scanner, a hand scanner (including an imaging mouse), web cam, a video camera, a still digital camera, etc. The processor 18 can be a general purpose or dedicated computer, including a CPU 20, memory 22, an interface 24 to the input device 16. Alternatively, the processor 18 could include dedicated electrical processing circuitry. The reader 14 may optionally include a display screen (or other output device) 26 and a network connection 28. The network connection can be used to connect, through a network, intranet, the internet, or otherwise, to a remote computer 30. Preferably, computer 30 includes a memory and a database (or other data structure). In an alternative embodiment, a database is locally maintained with the reader or the appliance. In this case, the reader preferably includes bus and/or communication structure to facilitate communications with the database and appliance.

Suitable software programming instructions, stored in memory 22 of processor 18, or in the memory of remote computer 30, can be used to affect various types of functionality for the reader and/or appliance. The software instructions may even be integrated with an operating system (e.g., Windows), application (e.g., a browser) or other software module.

One functionality is to enable an appliance to operate or perform a function. In this regard, the encoded information (e.g., watermark payload or identifier, encoded data or linked information) preferably serves as a monetary unit or access token. For example, the encoded information may serve as payment at a cash register, gaming machine, etc. In another example, a subway system accepts the encoded data as payment.

When the reader 14 senses the digital object identifier on article 12, the identifier may be dispatched to the database, which is maintained either locally or remotely. The database accesses a data record corresponding to that identifier. Stored in the data record is information specifying the response that should be provided. For example, the response may be to authorize a purchase based on available funds or credit, deny the purchase (e.g., indicate that the credit has been used or expired), or to provide credit or permission to enable an appliance (e.g., to turn on, operate, allow access to, play, activate, etc.). The accessed data record can be updated to reflect activity, purchases, the number of times accessed by individual appliances or vendors, etc.

In another embodiment, the reader 14 senses the digital object identifier. The reader decodes the identifier and/or extracts any additionally encoded data (e.g., a payload). In this embodiment, the identifier and/or payload provide the authorization, without the need to query a database. For example, the identifier and/or payload may contain a predetermined bit sequence, which when found by the decoder enables the appliance or approves a purchase. The reader (or appliance) could also keep a list of authorized identifiers. Such a list is consulted to determine whether a decoded identifier (or payload) matches an authorized identifier or bit sequence. The decoded identifier can be recorded to facilitate future payment, statistic gathering, etc. The predetermined sequence can be updated in the reader (or appliance) to respond differently to a plurality of identifiers, provide security, limit a time-window for an identifier, etc.

The encoded objects may be sponsored by advertisers or merchants, or may be obtained through payment.

An encoded object may also be refreshed once its predetermined credit or access limit is exhausted. For example, a casino issues digitally embedded objects, such as cards, that store monetary tokens used in gaming machines or other gambling. The embedded cards include an identifier, which is recorded each time a player uses the system. A system database can be employed to manage an identifier in relation to a number of monetary units dispensed or games played by the card's bearer. When a predetermined number is exhausted, a player can refresh the card by further payment. The rider presents the card to a reader, which is connected to a central database. The rider selects a refresh option (e.g., to add more money to the account) via the reader and adds additional payment (e.g., via a credit card, coin or bills). The database is updated accordingly. (Alternatively, the card is automatically refreshed via a direct withdrawal, credit card payment, etc.). This system provides additional security and convenience for the rider. If a card is lost, the rider can simply report the associated identifier to the database and request a refund or credit.

As discussed above, the monetary token may be the room key.

Electronic Gaming

Arcade-like video and interactive gambling games can also be equipped with a watermark reader. Encoded objects are then used to enable play as discussed above. The objects (e.g., an access card, ID, monetary tokens, etc.) can be purchased or sponsored. The objects can also be refreshed as discussed above.

Encoded objects can facilitate gaming restrictions. For example, the encoded identifier (or payload or accessed data) may include a bit (or bits), which restricts access to certain types of games. A player may be able to obtain an encoded object based upon suitable restrictions, such as age, membership, preferred customer status, etc. Preferably, the watermark reader will not enable a game if the control bit does not match the required level for that particular game.

While the detailed embodiments employ digital watermarking, other machine-readable data representations can be used instead (e.g., bar codes, glyphs, RF IDs, mag stripes, smart card technology, etc.).

As a further alternative, the watermark reader discussed above could compliment, instead of replace, a money receiver. This alternative allows for activation of an electronic gaming machine both by a coin (or bill) and a watermark token.

The reader technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

Stored Value Cards

An electronic money system (e.g., of the sort detailed in U.S. application 60/134,782, filed May 19, 1999) may encode embedded data on a card that leads to storage at which random-number tokens (which represent increments of money) are stored. Presenting the card to an embedded data reader system launches an application that reads and encrypts the tokens and forwards the encrypted data to the clearinghouse computer of the corresponding bank to learn their remaining value. There the tokens are decrypted and checked for validity (but not redeemed). The bank computer responds to the reader system, indicating the remaining value of the tokens on the card.

For security reasons, the storage containing the random-number tokens should not be generally accessible. Instead, the user must provide authentication data indicating authorization to gain access to that information. This authentication data may be a PIN code. Or the user may provide authentication by presenting a second encoded object, e.g., a driver's license to the reader system. (Many other reader systems may advantageously use, or require the use of, two or more embedded data objects—either presented one after the other, or all at the same time. The reader system can provide visual or audible prompts leading the user to present the further embedded data object(s) as necessary.

Using Digital Watermarks on Playing Cards and Casino Chips to Deter Cheating

Casinos around the world deploy considerable resources each year to deter cheating. To that end, playing cards and chips used for gaming and betting could be encoded with digital watermarks and used to enhance security. In this application, playing cards and chips are encoded with data unique to each casino, game, card deck and/or face value. Then, cameras placed above gaming tables are used to read the information off the cards and chips. The information from the cards could be used to alert security or keep records of suspicious activity in the following ways.

A camera placed above a card gaming table (like Blackjack) could read the data encoded in the backs of the cards determining the authenticity and face value of those cards. This means the camera could catch anyone trying to replace cards after they were dealt-either by flagging cards as not being part of the deck currently in use or by flagging them as being a different face value than those dealt to the player. If a player switches cards after they are dealt, the watermark reader in the camera can alert security of the fraudulent activity.

Additionally, the data encoded in the cards can be used to track the winner(s) at the table. If the dealer and the player are in collusion, that player may be dealt winning cards on a regular, predetermined basis (based on tricky shuffling by the dealer). By watching the pattern and face value of cards that are dealt, it can be determined if a player wins at a much higher than average rate. Again, security personnel can be alerted to suspicious activity.

Cameras placed above gaming tables where chips are used (certainly not limited to card games) can be programmed to watch for watermarks in chips. Any chip that does not include the appropriate watermark can signal that a chip might be counterfeit. In another situation, the face value of the chips can be determined as they are placed on the table such that any switching of the chips after play begins will be noted.

The foregoing principles are more generally applicable to monitoring and surveillance systems employing digital watermark technology to identify monitored objects.

Access Control and Age Verification

In another application, a digital watermark reader (or an online server in communication with such) determines whether the holder of a watermarked identity document is old enough to enter an online web site (such as an adult-oriented web site) by determining the holder's age from data embedded on the document (e.g., embedded data indexes a database record with age information, or embedded data carries age information, e.g., date of birth). Another implementation is used by clubs, casinos, and/or alcohol-serving establishments to verify a holder's age. (A watermarked license can be used in connection with so-called fragile watermarks to even further enhance security and prevent tampering. A fragile watermark typically degrades predictably or destructs upon copy and print processing, or digitally reproducing and then printing).

In another embodiment, instead of embedding a database-linked identifier in an ID card, a card is embedded with another payload. In this embodiment, the payload itself conveys the age (and/or other information) of the cardholder. Typically, the payload may include from 2-256 bits of information, which can be used by a watermark reader to determine age, and other related information.

The following excerpts from 60/421,254 describe, among other things, methods for performing age verification for access control, including controlling access to gambling, alcohol purchase, etc.

In one ID card implementation, a first digital watermark embedded in the card includes a payload or message bits corresponding to a first set of information. The first set of information preferably relates to the holder of the identification card (hereafter "cardholder") and/or to the issuing authority (e.g., state DMV or company) or jurisdiction. For example, the first set of information may include a unique identifier that is associated with the cardholder, date of birth, jurisdiction code, identification card number, name, address, physical characteristics (hair color, weight, sex, etc.), issue date, restrictions (e.g., age restrictions, driving limitations, etc.) and/or a hash (e.g., a reduced-bit representation) of such information.

Some advantages of watermarking to government agencies (e.g., DMV, law enforcement officials, and other authorized audiences) and financial institutions (depending on the implementation used) may include:

DMV forensics agents can detect cards that have been copied and altered, as well as track back to the originating card(s).

Point of sale agents for age-controlled products can locally authenticate a card with respect to card authenticity and age status, without gaining machine-readable access to the individual's demographic data and compromising cardholder's privacy. Also provides the ability to read cross-jurisdictional identification documents thus providing better data sharing.

Privacy Watermarking

In assignee's PCT application no. PCT/US01/14014 (published as WO 01/84438), we disclose embedding a cardholder's birth date on a security document such as an identification document. (The above PCT patent document is herein incorporated by reference). The birth date can provide anonymous age verification, especially for online verification or age-dependant transactions. Thus, an online merchant can verify a person's age (e.g., as embedded in a digital watermark) without compromising the person's identity. In addition, the birth date could be combined with a random number to anonymously verify someone's age while statistically track if that person was present given the person's card. In other words, it's still anonymous because the birth date and random number cannot be used to find the person, but the person can verify that they were present.

An improvement is to embed characteristics associated with the cardholder's biometric features (e.g., fingerprint, facial recognition, DNA-print, etc.) in the watermark. The characteristics may even include a hash of such biometric information. Then, e.g., to verify that a person is just not using their older sister's identification document for an online transaction, the user must present the embedded document (including an embedded age indicator as well as the biometric characteristic) as well as her own biometric sample (e.g., fingerprint). If the biometric sample and the embedded sample match, and if the embedded age indicator is sufficient, the transaction can proceed. Similar techniques can be used to verify age, e.g., at a bar, casino, or for the purchase of age-limited merchandise—all without compromising the person's identity.

These ideas are naturally extended with a copy detect watermark to provide both age verification and security document authentication—both anonymously. (A copy detect watermark is one that indicates whether a detected watermark, or underlying media or document, is a copy. The watermark can be fragile or can include message bits to indicate the copy, etc.).

In addition, for image authentication, we can compare an embedded message in an identification document photograph (or graphic) to a hash of information printed or carried on the card. Preferably, a complete hash of the information, e.g., a 64-bit payload, includes two hashes, such as a short hash and long hash. The full hash (or the long hash) can be registered in a data repository as a cardholder's official registered identifier. Information associated with the person can be stored to be accessed with the full or long hash. The short hash is used to identify the identification document (or simply to identify a certain age or age level). For example, a 12-bit short hash has 4096 numbers—producing an extremely small likelihood of overlap. As such, a bar or casino can demonstrate that they checked everyone in the bar or casino through examination of the short hash, while protecting the anonymity of the patrons since the short hash cannot identify exactly who was in the bar or casino. This more private information can be obtained through the long hash and/or data repository.

As an alternative to a short hash of information, the cardholder's birth date is used as a semi-unique ID. To provide even further uniqueness, we can add additional bits to the birth date, so the likelihood of overlap with another identification document (short hash) lessens.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method comprising:
capturing an image of a gaming object;
extracting identifying information from the image of the gaming object; and
using the extracted identifying information to reference a database to determine a machine behavior associated with the identifying information, and returning data to an electronic gaming system to execute or control the machine behavior of the electronic gaming system to control game play in response to the gaming object.

2. The method of claim 1, wherein the extracted identifying information is used to present promotional opportunities on a user interface of the electronic gaming system.

3. The method of claim 1, wherein the machine behavior comprises enabling a player to obtain monetary credits for products or services.

4. The method of claim 1, wherein the gaming object comprises a gaming token for gambling games.

5. The method of claim 1, wherein the gaming object comprises a playing object used in gambling games.

6. The method of claim 1, wherein the identifying information comprises information identifying a gaming venue.

7. The method of claim 1, wherein the machine behavior is personalized based on identity of a user of the electronic gaming system.

8. The method of claim 1, further comprising checking the database by comparing image attributes of the gaming object with stored image attributes in a database.

9. The method of claim 1, further comprising using the identifying information to authenticate the gaming object.

10. The method of claim 9, further comprising using image attributes captured of the gaming objet to authenticate the gaming object.

11. A method comprising:
capturing an image of a gaming object;
extracting identifying information from the image of the gaming object; and
using the extracted identifying information to reference a database to determine a behavior associated with the identifying information, and returning data to a gaming system to execute or control the behavior of the gaming system in response to the gaming object; wherein the gaming object comprises a playing object used in promotional games.

12. A method comprising:
capturing an image of a gaming object;
extracting identifying information from the image of the gaming object;
using the extracted identifying information to reference a database to determine a behavior associated with the identifying information, and returning data to the gaming system to execute or control the behavior of the gaming system in response to the gaming object; and
deriving gestural input using the gaming object.

13. A method comprising:
determining identifying information of a gaming object, the identifying information being conveyed in the gaming object and extractable through an image captured of the gaming object;
assigning a machine behavior to the gaming object to control game play of an electronic gaming system; and
storing the identifying information of the gaming object in association with the gaming object in a database system, wherein the database system is responsive to a request to provide the machine behavior in response to the identifying information to control the game play of the electronic gaming system.

14. The method of claim 13, wherein the extracted identifying information is used to present promotional opportunities on a user interface of the electronic gaming system.

15. The method of claim 13, wherein the machine behavior comprises enabling a player to obtain monetary credits for products or services.

16. The method of claim 13, wherein the gaming object comprises a gaming token for gambling games.

17. The method of claim 13, wherein the gaming object comprises a playing object used in gambling games.

18. A method comprising:
determining identifying information of a gaming object, the identifying information being conveyed in the gaming object and extractable through an image captured of the gaming object;
assigning a behavior to the gaming object; and
storing the identifying information of the gaming object in association with the gaming object in a database system, wherein the database system is responsive to a request to provide the behavior in response to the identifying information; wherein the gaming object comprises a playing object used in promotional games.

19. A system comprising:
an interface configured to receive an image captured of a gaming object;
a programmed processor configured to:
extract identifying information from the image of the gaming object; and
use the extracted identifying information to reference a database to determine a machine behavior associated with the identifying information, and returning data to execute or control the machine behavior of the electronic gaming system to control game play in response to the gaming object.

20. A system comprising:
an interface configured to receive an image of a gaming object;
a processor configured to:
determine identifying information conveyed by the gaming object, the identifying information being conveyed in the gaming object and extractable through an image captured of the gaming object;
assign a machine behavior to the gaming object to control game play of an electronic gaming system; and
a database system configured to store the identifying information of the gaming object in association with the gaming object, wherein the database system is responsive to a request to provide the machine behavior in response to the identifying information to control the game play of the electronic gaming system.

21. A non-transitory computer-readable medium having instructions stored thereon that, if executed by a computing device, cause the computing device to perform operations comprising:
capturing an image of a gaming object;
extracting identifying information from the image of the gaming object; and
using the extracted identifying information to reference a database to determine a machine behavior associated with the identifying information, and returning data to an electronic gaming system to execute or control the machine behavior of the electronic gaming system to control game play in response to the gaming object.

22. A non-transitory computer-readable medium having instructions stored thereon that, if executed by a computing device, cause the computing device to perform operations comprising:
determining identifying information of a gaming object, the identifying information being conveyed in the gaming object and extractable through an image captured of the gaming object;
assigning a machine behavior to the gaming object to control game play of an electronic gaming system; and
storing the identifying information of the gaming object in association with the gaming object in a database system, wherein the database system is responsive to a request to provide the machine behavior in response to the identifying information to control the game play of the electronic gaming system.

* * * * *

UNITED STATES PATENT AND TRADEMARK OFFICE
CERTIFICATE OF CORRECTION

| | | |
|---|---|---|
| PATENT NO. | : 8,027,508 B2 | Page 1 of 1 |
| APPLICATION NO. | : 12/534539 | |
| DATED | : September 27, 2011 | |
| INVENTOR(S) | : Rhoads et al. | |

It is certified that error appears in the above-identified patent and that said Letters Patent is hereby corrected as shown below:

Title Page, item (45), under "Date of Patent", in Column 1, Line 1, delete "Sep. 27, 2011" and insert -- *Sep. 27, 2011 --.

Title Page, Item "Notice", delete "Subject to any disclaimer, the term of this patent is extended or adjusted under 35 U.S.C. 154(b) by 0 days." and insert -- Subject to any disclaimer, the term of this patent is extended or adjusted under 35 U.S.C. 154(b) by 0 days. This patent is subject to a terminal disclaimer. --.

Column 25, line 2, in Claim 10, delete "objet" and insert -- object --.

Signed and Sealed this
Fifteenth Day of May, 2012

David J. Kappos
*Director of the United States Patent and Trademark Office*